C. PETERSON.
RUNNER ATTACHMENT FOR AUTOMOBILES.
APPLICATION FILED MAR. 25, 1919.
1,337,153.
Patented Apr. 13, 1920.
2 SHEETS—SHEET 1.
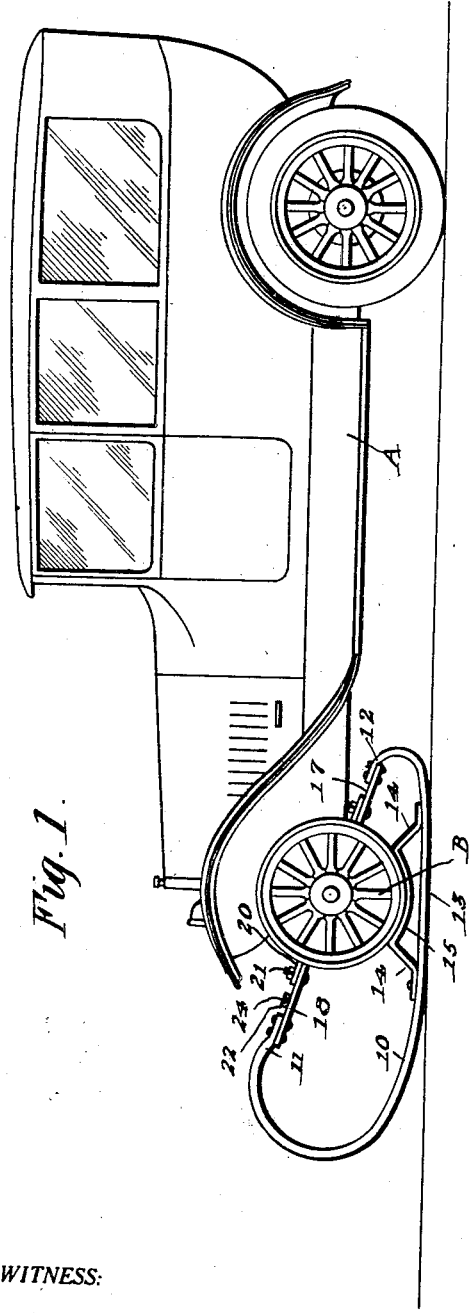
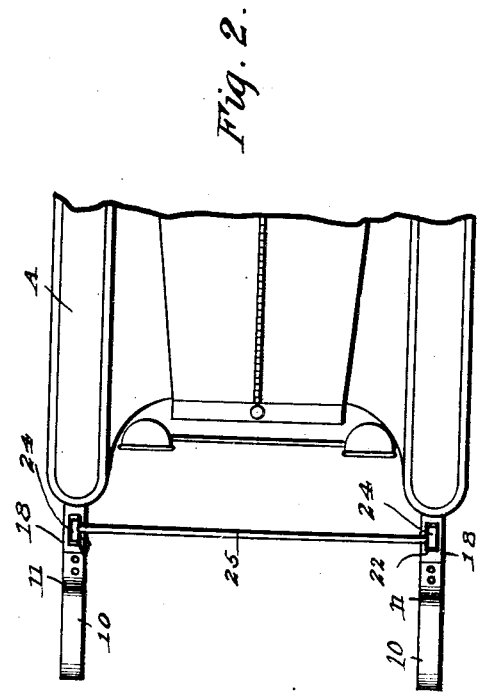
WITNESS:
INVENTOR.
C. Peterson
BY
ATTORNEY.

C. PETERSON.
RUNNER ATTACHMENT FOR AUTOMOBILES.
APPLICATION FILED MAR. 25, 1919.
1,337,153.
Patented Apr. 13, 1920.
2 SHEETS—SHEET 2.
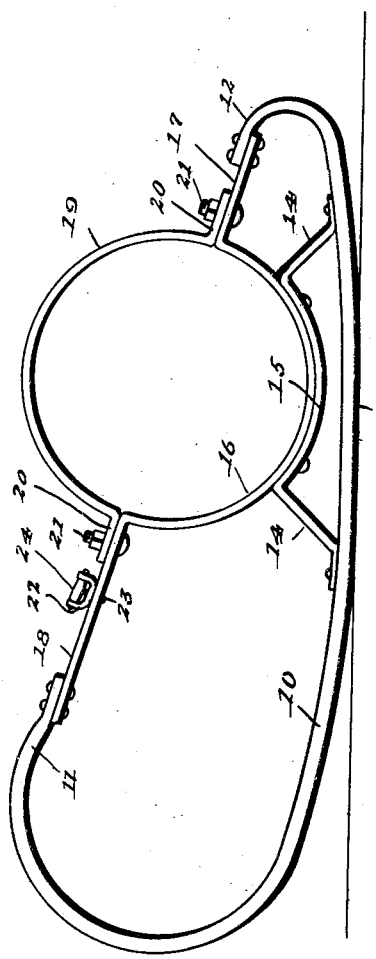
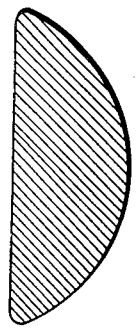
WITNESS:
P. G. Thomas
INVENTOR.
C. Peterson
BY
Victor J. Evans
ATTORNEY.

UNITED STATES PATENT OFFICE.

CHARLIE PETERSON, OF CRYSTAL FALLS, MICHIGAN.

RUNNER ATTACHMENT FOR AUTOMOBILES.

1,337,153.  Specification of Letters Patent.  Patented Apr. 13, 1920.

Application filed March 25, 1919. Serial No. 284,932.

*To all whom it may concern:*

Be it known that I, CHARLIE PETERSON, a citizen of the United States, residing at Crystal Falls, in the county of Iron and State of Michigan, have invented new and useful Improvements in Runner Attachments for Automobiles, of which the following is a specification.

This invention relates to automobile attachments and has for its object the provision of runners adapted for connection upon the front wheels of an automobile after the pneumatic tires have been removed, the device being formed in sections adapted to be clamped upon a wheel.

An important object is the provision of a device of this character in which the runners are longitudinally bowed whereby but a small portion thereof will engage the surface traveled over so as to facilitate steering.

Another object is the provision of a device of this character in which the runners have their lower surfaces convex in cross section to minimize danger of side slipping or skidding.

Another object is the provision of a device of this character in which the runner members on the two front wheels are connected by a transverse rod which has its end portions provided with universal joints, this construction insuring simultaneous movement of the runners under the influence of the steering wheel.

A further object is the provision of a device of this character which will be very simple and inexpensive in manufacture, which may be readily installed even by an unskilled person, which will be efficient in service, durable in use, and a general improvement in the art.

With the above and other objects and advantages in view, the invention consists in the details of construction to be hereinafter more fully described and claimed, and illustrated in the accompanying drawings, in which—

Figure 1 is a side elevation of an automobile showing my runners applied thereto, Fig. 2 is a plan view of the forward portion of the automobile and the runners, Fig. 3 is a side elevation of one of the runners detached from the automobile and on a larger scale than that of Fig. 1, Fig. 4 is a cross sectional view showing one form of runner, and Fig. 5 is a cross sectional view through a modified form of runner.

Referring more particularly to the drawings, the letter A designates an automobile and B designates the front wheels thereof. It is understood that in the application of my invention the ordinary pneumatic tires upon the forward wheels are removed.

In carrying out my invention, I provide a runner 10 which has its forward portion curved upwardly and rearwardly, as shown at 11, in a shape similar to that of the runner of a cutter or sleigh, and which has its rear end curved upwardly and forwardly, as shown at 12. This runner 10 is formed of steel and preferably has its lower edge convex, as shown in both Figs. 4 and 5. The runner may be solid with a flat upper face, as shown in Fig. 4, or may be concavo-convex, as shown in Fig. 5. Regardless of which form of runner is used, the runner is curved longitudinally so that only one relatively short portion 13 will engage the surface traveled over, whereby to facilitate steering, the point of contact of the runner with the surface traveled over being preferably immediately below the center of the wheel B. Disposed upon the portion 13 of the runner is a supporting member including upwardly converging brace portions 14 having their ends secured upon the top of the runner and further including a curved portion 15 connecting the upper ends of the brace portions 14. Secured upon the curved portion 15 is a saddle member 16 which is semicircular in shape and which has one end provided with an extension 17 bolted or riveted to the rear end 12 of the runner and which has its other end provided with a similar extension 18 secured to the forward end 11 of the runner. The curvature of this saddle member 16 is such as to conformingly engage one-half of the wheel B. Associated with the saddle member 16 is a clamping member 19 which is also semicircular in shape for embracing engagement with the wheel B and which is complementary to the saddle member 16. This clamping member 19 has its ends provided with ears 20 through which extend bolts 21 passing through the extensions 17 and 18 of the saddle member.

The runners are applied to the wheels by lifting the wheels and positioning them upon the saddle members 16, after which the clamping members 19 are placed upon the wheels and the bolts 21 secured in position.

In order to insure simultaneous movement of the runners responsive to the steering wheel of the automobile, I provide a U-shaped bracket 22 swiveled as at 23, upon each of the extensions 18 and having pivoted between its arms a head 24 formed on a connecting rod 25. The pivotal connection of the head 24 with the brackets 22 and the swiveled connection of the brackets 22 with the extensions 18, constitute swivel joints at the end of the connecting rod 25 whereby the rod 25 may accommodate itself to movements of the runner under the influence of the steering wheel without any danger of binding.

From the foregoing description and a study of the drawings, it will be apparent that I have thus provided a very simple runner attachment which may be quickly and easily clamped upon the front wheels of an automobile whereby an automobile may be driven more easily through snow, the peculiar longitudinal bowing of the runners insuring easy steering, and the provision of the transverse rod connecting the runners insuring simultaneous movement of the runners responsive to the action of the steering wheel.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A runner attachment for the front wheels of automobiles comprising a runner member longitudinally bowed and having its forward and rear ends upwardly and rearwardly and upwardly and forwardly curved, respectively, a supporting member secured upon the top of the runner member and including upwardly converging brace members and an arcuate portion connecting the brace members, a semicircular saddle member secured upon said curved portion and having its ends provided with extensions secured upon the forward and rear ends of the runner member, said saddle member being adapted to engage the lower portion of the periphery of a wheel rim, and a semicircular clamping member complementary to the saddle member and adapted for embracing engagement upon the upper portion of the periphery of the wheel rim, said clamping member being detachably connected with the saddle member.

In testimony whereof I affix my signature.

CHARLIE PETERSON.